(12) United States Patent
Graves et al.

(10) Patent No.: US 9,978,467 B2
(45) Date of Patent: May 22, 2018

(54) EXCAVATION AND WELD REPAIR METHODOLOGY FOR PRESSURIZED WATER REACTOR PIPING AND VESSEL NOZZLES

(71) Applicant: Framatome Inc., Lynchburg, VA (US)

(72) Inventors: Charles A. Graves, Forest, VA (US); David E. Waskey, Bedford, VA (US); Andrew C. Smith, Huddleston, VA (US); Kenneth B. Stuckey, Forest, VA (US)

(73) Assignee: Framatome Inc., Lynchburg, VA (US)

( * ) Notice: Subject to any disclaimer, the term of this patent is extended or adjusted under 35 U.S.C. 154(b) by 317 days.

(21) Appl. No.: 14/940,792

(22) Filed: Nov. 13, 2015

(65) Prior Publication Data

US 2016/0141057 A1    May 19, 2016

Related U.S. Application Data

(60) Provisional application No. 62/079,015, filed on Nov. 13, 2014.

(51) Int. Cl.
*B23P 6/00* (2006.01)
*G21C 17/017* (2006.01)
(Continued)

(52) U.S. Cl.
CPC .............. *G21C 17/017* (2013.01); *B23P 6/00* (2013.01); *B23P 6/007* (2013.01); *B23P 6/04* (2013.01);
(Continued)

(58) Field of Classification Search
CPC .... B23P 6/00; B23P 6/007; B23P 6/04; B23P 15/008; Y10T 29/531; Y10T 29/49352; Y10T 29/49732; Y10T 29/4973; Y10T 29/49728; Y10T 29/49726; Y10T 29/49734; Y10T 29/49746;
(Continued)

(56) References Cited

U.S. PATENT DOCUMENTS

| 4,615,477 | A | * | 10/1986 | Spada | F16L 41/084 228/119 |
| 4,631,168 | A | * | 12/1986 | Shallenberger | G21C 3/33 376/353 |
| 4,682,397 | A | * | 7/1987 | Harth, III | A46D 1/00 29/81.05 |
| 5,196,160 | A | | 3/1993 | Porowski | |
| 5,271,048 | A | | 12/1993 | Behnke et al. | |
| 5,274,683 | A | * | 12/1993 | Broda | G21C 1/09 29/890.031 |

(Continued)

*Primary Examiner* — Jermie Cozart
(74) *Attorney, Agent, or Firm* — Davidson, Davidson & Kappel, LLC

(57) ABSTRACT

The invention is an innovative design/repair methodology for PWR piping nozzles and vessel nozzles that are attached to the piping/vessel base material with a full penetration weld joint geometry. The development of a robust repair methodology for nozzles of this configuration is necessary due to plant aging, potential material degradation in the original materials of construction, potential increased non-destructive examination requirements, and PWSCC phenomena in the susceptible original materials of construction. The purpose/objective of the repair methodology is to provide a means of partially replacing the existing pressure boundary susceptible materials with PWSCC-resistant materials to facilitate the long-term repair life of the plant. The invention may be applied to a plurality of nozzle, piping, and vessel sizes with a full penetration weld joint.

14 Claims, 3 Drawing Sheets

(51) Int. Cl.
*B23P 6/04* (2006.01)
*B23P 15/00* (2006.01)
*G21C 13/036* (2006.01)
*G21C 19/20* (2006.01)

(52) U.S. Cl.
CPC .......... *B23P 15/008* (2013.01); *G21C 13/036* (2013.01); *G21C 19/207* (2013.01); *G21Y 2004/40* (2013.01); *G21Y 2004/50* (2013.01); *Y02E 30/40* (2013.01); *Y10T 29/4973* (2015.01); *Y10T 29/49732* (2015.01)

(58) Field of Classification Search
CPC ............ Y10T 29/49742; G21C 17/017; G21C 19/207; G21C 17/007; G21C 1/086; G21C 13/036; B23K 26/1494; B23K 31/02; B23K 2201/12; G21Y 2004/301; G21Y 2004/40; G21Y 2004/50
See application file for complete search history.

(56) References Cited

U.S. PATENT DOCUMENTS

| | | | |
|---|---|---|---|
| 5,367,768 A * | 11/1994 | Weems | B21D 39/06 |
| | | | 29/727 |
| 5,404,382 A | 4/1995 | Russ et al. | |
| 5,428,198 A | 6/1995 | Peigney et al. | |
| 5,605,361 A | 2/1997 | Sims | |
| 5,661,767 A | 8/1997 | Roux | |
| 5,809,098 A | 9/1998 | Deaver | |
| 5,918,911 A | 7/1999 | Sims | |
| 8,867,688 B2 | 10/2014 | Hori et al. | |
| 9,180,557 B1 | 11/2015 | Graves et al. | |
| 2007/0253519 A1 * | 11/2007 | Meier | G01N 29/2487 |
| | | | 376/260 |
| 2008/0008287 A1 * | 1/2008 | Riccardella | G21C 13/036 |
| | | | 376/260 |
| 2011/0194663 A1 * | 8/2011 | Hori | F16L 5/022 |
| | | | 376/204 |

* cited by examiner

EXCAVATION AND WELD REPAIR METHODOLOGY FOR PRESSURIZED WATER REACTOR PIPING AND VESSEL NOZZLES

CROSS-REFERENCE TO RELATED APPLICATIONS

This patent application claims the benefit of U.S. Provisional Patent Application No. 62/079,015 filed on Nov. 13, 2014, which is incorporated herein by reference in its entirety.

BACKGROUND OF THE INVENTION

1. Field of the Invention

The present invention relates to weld repair, and, more particularly, the present invention relates to weld repair of irradiated materials susceptible of primary water stress corrosion cracking 2. Description of the Related Art Over the past approximately 15 years, the commercial nuclear power industry has been required to perform examinations of Inconel® 600 nozzles and Inconel® 82/182 welds due to the emergence of primary water stress corrosion cracking (PWSCC), as these materials are known to be susceptible to PWSCC in the environment in which these materials are commonly exposed to within a nuclear pressurized water reactor (PWR), In many cases, repairs of these nozzles and welds have been required as the examinations have revealed minor indications/discontinuities or, in a small number of cases, minor leakage of the reactor coolant. Numerous repair methods have been utilized in the industry in order to repair the Inconel® 600 nozzles and associated attachment welds, and many of the welds which have been repaired within the industry are of a partial penetration J-groove type geometry. The full penetration welded nozzles, as shown in FIG. 1, present a unique set of challenges when evaluating the application of a known repair method in the industry.

One possible known repair method which could be applied to the full penetration welded nozzle is to apply a structural weld overlay o the outside of the piping or vessel with the overlay covering the full extents of the susceptible nozzle and weld material with substantial overlap onto the piping or vessel. For this application, the existing nozzle would be removed approximately flush with the outer surface of the piping or vessel. The overlay would then be applied to cover the full extents of the remaining nozzle and existing susceptible weld material with overlap onto the piping or vessel. A bore is then machined into the new weld overlay to accept a replacement nozzle fabricated from PWSCC-resistant materials, The thickness and size of the overlay, based upon ASME Boiler & Pressure Vessel Code Section rules, would ultimately result in a significant volume of weld material being applied to the location. This inherently results in long schedule duration for welding, potential for high personnel radiation exposure, and high risks of potential welding issues as a result of depositing such a large PWSCC-resistant nickel alloy weld overlay.

SUMMARY OF THE INVENTION

The invention is an innovative design/repair methodology for PWR piping nozzles and vessel nozzles which are attached to the piping/vessel base material with a full penetration weld joint geometry during original construction. The development of a robust repair methodology for nozzles of this configuration is necessary due to plant aging, potential material degradation in the original materials of construction, potential increased nondestructive examination (NDE) requirements, and PWSCC phenomena in the susceptible original materials of construction. The purpose/objective of the repair methodology is to provide a means of partially replacing the existing pressure boundary susceptible materials with PWSSCC-resistant materials to facilitate the long-term repair life of the plant. The invention may be applied to a plurality of nozzle, piping, and vessel sizes with a full penetration weld joint.

The invention provides a robust repair solution that can be implemented within a shorter schedule duration versus a conventional weld overlay as described above. The invention described herein significantly reduces the size of the weld joint, and subsequent weld volume, required in comparison to a weld overlay. As a result, the schedule duration for welding on-component is significantly reduced, and the risk of welding defects is significantly reduced as well. In the case that a repair is required on an emergent basis, i.e. unplanned repair, a critical path schedule savings may be realized by the utility in comparison to an overlay.

DESCRIPTION OF THE DRAWINGS

The present invention is described with reference to the accompanying drawings, which illustrate exemplary embodiments and in which like reference characters reference like elements, it is intended that the embodiments and figures disclosed herein are to be considered illustrative rather than restrictive.

DETAILED DESCRIPTION OF THE INVENTION

The invention described herein is an innovative design/repair methodology for PWR piping nozzles and vessel nozzles which are attached to the piping/vessel base material with a full penetration weld joint geometry during original construction. The development of a robust repair methodology for nozzles of this configuration is necessary due to plant aging, potential material degradation in the original materials of construction, potential increased NDE requirements, and PWSCC phenomena in the susceptible original materials of construction. The purpose/objective of the repair methodology is to provide a means of partially replacing the existing pressure boundary susceptible materials with PWSCC-resistant materials to facilitate the long-term repair life of the plant. The invention described herein may be applied to a plurality of nozzle, piping, and vessel sizes with a full penetration weld joint.

Figure 1:
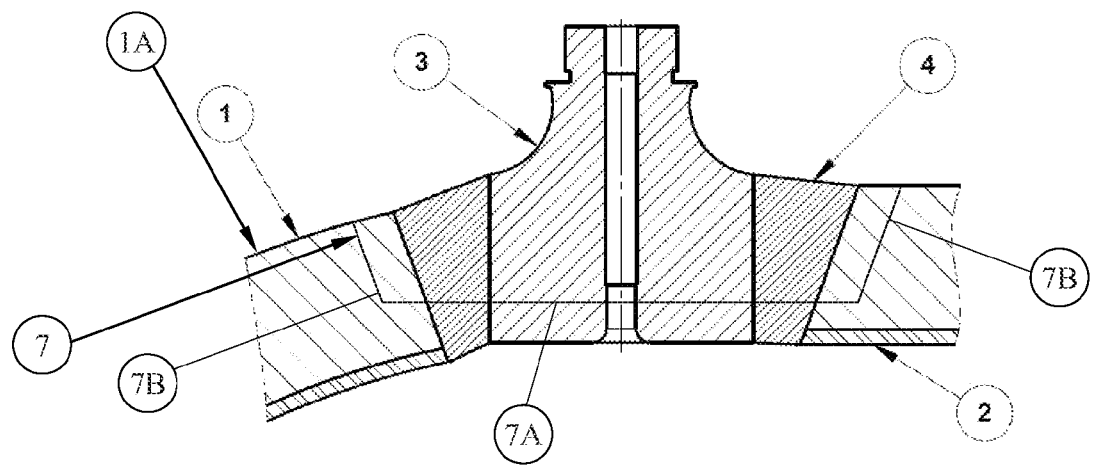
FIG. 1 shows a cross sectional view of a typical existing/original piping or vessel nozzle with which the present invention is used.

FIG. 1 shows a typical cross sectional example of the existing/original configuration of the piping nozzle and/or vessel nozzle. The existing piping or vessel base material 1 is typically fabricated from low alloy or carbon steel. The existing cladding material 2 is typically applied. by welding utilizing stainless steel filler material. The existing nozzle 3 extends through the wall thickness of the piping or vessel base material 1. The nozzle 3 is typically fabricated from PWSCC-susceptible materials such as Unified Numbering System (UNS) N06600, also commonly known as Inconel® Alloy 600 or Alloy 600. The existing pressure boundary weld 4, typically a full penetration structural dissimilar metal weld (DMW), attaches the nozzle 3 to the base material 1. The material of the weld 4 is typically UNS N06082, commonly known as Inconel® Filler Metal 82, or a combination of Inconel® Filler Metals 82 and 182 (UNS W86182).

Figure 2:
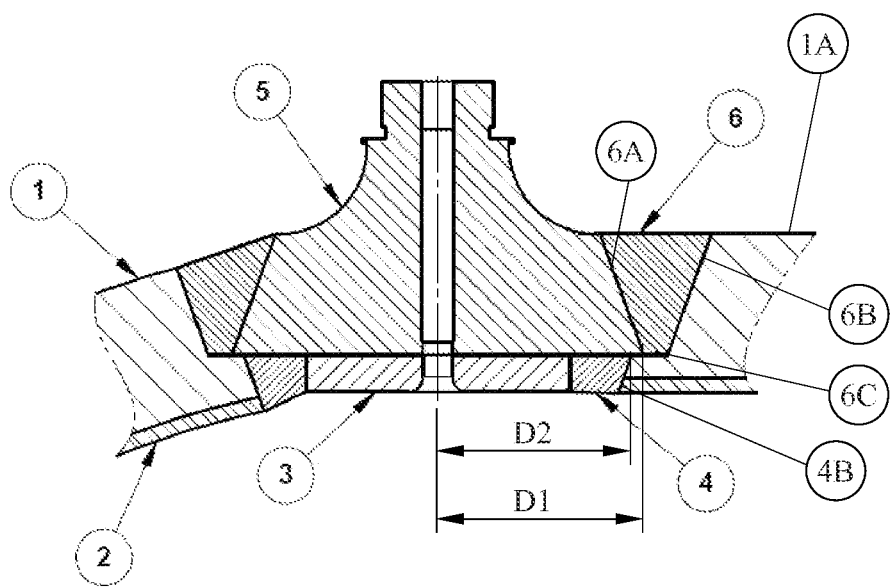
FIG. 2 shows a cross sectional view of a repaired nozzle according to the present invention.

The invention provides a robust repair solution that can be implemented within shorter schedule duration versus a conventional weld overlay. A typical cross sectional example of the invention is shown in FIG. 2 with a possible variation shown in FIG. 3. It is noted that the examples of the invention depicted may be applied to a plurality of nozzle, piping, and vessel sizes with a full penetration weld joint similar to that shown in FIG. 1. As such, it should be understood that there may be variations in geometry, such as in the case that an excavation is performed with subsequent use of a replacement nozzle and structural attachment weld. Such variations are within the scope of the present invention. As used herein, "original" refers to components prior to being repaired according to the invention presented herein, including components in place since initial operation of the plant as well as any previously repaired or replaced components.

Figure 3:
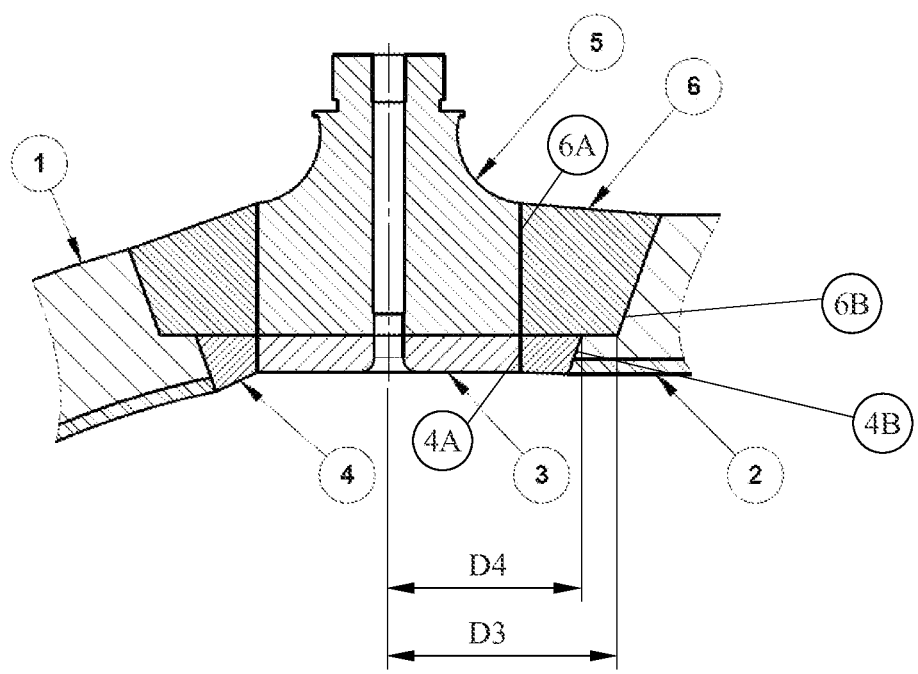
FIG. 3 shows cross sectional view of a repaired nozzle according to the present invention.

Referring to FIGS. 2 and 3, the existing piping or vessel includes base material I, cladding material 2, original nozzle 3, and original weld 4 as described above. Any downstream small-bore piping or instrumentation is removed from the target nozzle 3 to be repaired. A portion of the original/old nozzle 3 extending outboard from the outer surface 1A of the piping or vessel I is removed by cutting, grinding, machining, or any comparable process, to approximately flush with the outer surface 1A. A portion of the existing nozzle 3 and existing nozzle to base material structural attachment weld 4 is removed (excavated) by machining (or any comparable process thereof), creating a counterbore in the base material 1. Thus, FIGS. 2 is and 3 illustrate an existing nozzle 3 remnant and an existing weld 4 remnant. Line 7 in FIG. 1 illustrates an example cut line and a resulting counterbore having a base surface 7A and a side wall 7B. (The base material 1, original nozzle 3, and original weld 4 above the cut line 7 in FIG. 1 would be excavated to create the counterbore.) A replacement nozzle 5 is installed into the excavated area and centered upon the bore of the existing nozzle 3 remnant. The replacement nozzle 5 preferably is fabricated from PWSCC-resistant materials, such as but not limited to UNS N06690, commonly known as Inconel® Alloy 690 or Alloy 690. A new pressure boundary weld 6 is deposited preferably utilizing PWSCC-resistant materials, such as but not limited to UNS N06054, commonly known as Inconel® Filler Metal 52M. The new pressure boundary weld 6 would typically be applied utilizing the ambient temperature temper bead technique, which is accepted by the ASME B&PV Code and widely used within the industry. The new pressure boundary structural weld 6 attaches the new nozzle 5 to existing base material 1 at the counterbore side wall 7B. Preferably, NDE is performed at defined instances throughout the process in known manner to verify and ensure the quality of the base material 1 and the replacement weld 6. The downstream small-bore piping or instrumentation is reinstalled to the target nozzle to complete the repair.

FIG. 2 illustrates a first preferred replacement weld 6 configuration. In this instance, a V-shaped space or trough is formed between the replacement nozzle 5 and the base material 1 within the excavated counterbore. The replacement weld 6 is applied within the space, creating an inner weld surface 6A, an outer weld surface 6B, and a bottom weld surface 6C when viewed in cross section. The replacement nozzle 5 and counterbore are configured such that when the replacement weld 6 is applied, the inner surface 6A of the new weld 6 is outside the outer surface 4B of the original weld 4. In other words, the distance D1 from the nozzle 5 centerline to the new weld inner surface 6A at the counterbore base surface 7A is greater than the distance D2 from the nozzle 5 centerline to the old weld outer surface 4B at the counterbore base surface 7A. Thus, there is no overlap between the old 4 and new 6 welds. Distance D1 is measured substantially perpendicularly to the nozzle 5 centerline to the lowermost portion of the new weld 6 closest to the counterbore base surface 7A. Similarly, distance D2 is measured substantially perpendicularly to the nozzle 5 centerline to the uppermost portion of the original weld 4 closest to the counterbore base surface 7A.

FIG. 3 illustrates a second preferred replacement weld 6 configuration. In this instance, the space formed between the replacement nozzle 5 and the base material 1 within the excavated counterbore has a substantially vertical inside surface when viewed in cross section. The replacement nozzle 5 and counterbore preferably are configured such that when the replacement weld 6 is applied, the inner surface 6A of the new weld 6 is substantially aligned with the inner surface 4A of the existing weld 4, and the outer surface 6B of the new weld 6 is outside the outer surface 4B of the original weld 4. In other words, the distance D3 from the nozzle 5 centerline to the new weld outer surface 6B at the counterbore base surface 7A is greater than the distance D4 from the nozzle 5 centerline to the old weld outer surface 4B at the counterbore base surface 7A. Thus, the new weld 6 overlaps the old weld 4. Distance D3 is measured substantially perpendicularly to the nozzle 5 centerline to the lowermost portion of the new weld 6 closest to the counterbore base surface 7A. Similarly, distance D4 is measured substantially perpendicularly to the nozzle 5 centerline to the uppermost portion of the original weld 4 closest to the counterbore base surface 7A.

The invention provides for a smaller pressure boundary structural attachment weld between the replacement nozzle and the surrounding base material, which significantly reduces installation schedule duration, personnel radiation dose exposure, and risk of welding defects. These claims are made in comparison of the present invention versus the known repair methodology of structural weld overlays or weld buildups/pads commonly known within the industry.

The invention provides for a permanent repair of compromised leaking piping nozzles and/or vessel nozzles in PWRs through the use of PWSCC-resistant materials as described herein.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A method of repairing an original weld connecting a base material to an original nozzle, comprising:
   removing a portion of the base material, the original nozzle, and the original weld to create a counterbore having a base surface and a side all such that at least some of the original nozzle and the original weld remain creating an original nozzle remnant and an original weld remnant;
   providing a replacement nozzle having a bottom surface;
   placing said replacement nozzle within the counterbore such that said bottom surface contacts said counterbore base surface and a void is created between said replacement nozzle and said counterbore side wall; and
   depositing a replacement weld in said void to attach said replacement nozzle to said counterbore side
   wherein said replacement nozzle and said replacement weld are formed of materials resistant to primary water stress corrosion cracking.

2. The method of claim 1, wherein said depositing includes attaching said replacement nozzle to the base material.

3. The method of claim 1, wherein said depositing further includes attaching said replacement nozzle to the original weld remnant.

4. The method of claim 1, wherein said depositing includes depositing said replacement weld such that there is no overlap between said replacement weld and the original weld remnant.

5. The method of claim 4, wherein:
   said replacement nozzle includes a bore having a centerline;
   a first distance is defined as a distance measured substantially perpendicularly from said centerline to said replacement weld at a portion of said replacement weld closest to said centerline and said counterbore base surface;
   a second distance is defined as a distance measured substantially perpendicularly from said centerline to the original weld remnant at a portion of the original weld remnant closest to said centerline and said counterbore base surface; and
   said placing includes placing said replacement nozzle within said counterbore such that said first distance is greater than said second distance.

6. The method of claim 1, wherein said depositing includes depositing said replacement weld such that there is an overlap between said replacement weld and the original weld remnant.

7. The method of claim 6, wherein:
   said replacement nozzle includes a bore having a centerline;
   a first distance is defined as a distance measured substantially perpendicularly from said centerline to said replacement weld at a portion of said replacement weld closest o said centerline and said counterbore base surface;
   a second distance is defined as a distance measured substantially perpendicularly from said centerline to the original weld remnant at a portion of the original weld remnant closest to said centerline and said counterbore base surface; and
   said placing includes placing said replacement nozzle within said counterbore such that said first distance is substantially the same as said second distance.

8. The method of claim 6, wherein:
   said replacement nozzle includes a bore having a centerline;
   a first distance is defined as a distance measured substantially perpendicularly from said centerline to said replacement weld at a portion of said replacement weld furthest from said centerline and closest to said counterbore base surface;
   a second distance is defined as a distance measured substantially perpendicularly from said centerline to the original weld remnant at a portion of the original weld remnant furthest from said centerline and closest to said counterbore base surface; and
   said placing includes placing said replacement nozzle within said counterbore such that said first distance is greater than said second distance.

9. The method of claim 1, wherein said depositing includes depositing said replacement weld utilizing an ambient temperature temper bead technique.

10. The method of claim 1, further comprising performing nondestructive examination of said replacement weld to ensure integrity of said replacement weld.

11. The method of claim 1, further comprising removing any piping or instrumentation from the original nozzle prior to said removing.

12. The method of claim 1, wherein the base material is part of a pressure vessel or piping having an inner surface and an inside surface of the original nozzle remnant and an inside portion of the original weld remnant form part of the inner surface.

13. The method of claim 1, wherein:
   the original nozzle remnant includes a bore therethrough and said replacement nozzle includes a bore therethrough; and
   said placing includes aligning said replacement nozzle bore with the original nozzle remnant bore.

14. The method of claim 1, wherein the original weld is a full penetration weld.

* * * * *